INVENTOR.
Edwin Frankland
BY
J. S. Murray
ATTORNEY.

Aug. 19, 1941.　　　E. FRANKLAND　　　2,252,968
FURNACE
Original Filed July 8, 1936　　2 Sheets-Sheet 2

INVENTOR.
Edwin Frankland
BY
J.S. Murray
ATTORNEY.

Patented Aug. 19, 1941

2,252,968

UNITED STATES PATENT OFFICE 2,252,968

FURNACE

Edwin Frankland, Detroit, Mich.

Application July 8, 1936, Serial No. 89,583
Renewed June 14, 1940

7 Claims. (Cl. 158—1)

This invention relates to furnaces and particularly fluid fuel furnaces.

An object of the invention is to arrange within the combustion chamber and above the burner of a fluid fuel furnace a structure of high thermal capacity materially retarding the upflow of combustion gases and maintained thereby at a high enough temperature to strongly promote radiation of heat and thorough combustion of the fluid fuel. The term "heat conserver" hereinafter designates such structure.

Another object is to conduct the combustion gases in a fluid fuel furnace through a heat conserver comprising inner and outer pipes and a baffle member spirally rising between said pipes.

A further object is to provide a heat conserver having a sectional construction facilitating its manufacture and its introduction into a combustion chamber through the fire door opening of a furnace.

A further object is to provide for an upflow of combustion gases both through and around a heat conserver, and to extend the conserver into such proximity to the dome of a combustion chamber as to retard the exterior flow.

A further object is to adapt a heat conserver to be vertically adjusted to regulate a flow of combustion gases between the conserver and the dome of a combustion chamber.

These and various other objects the invention attains by the construction hereinafter described and illustrated in the accompanying drawings, wherein.

Figure 1:
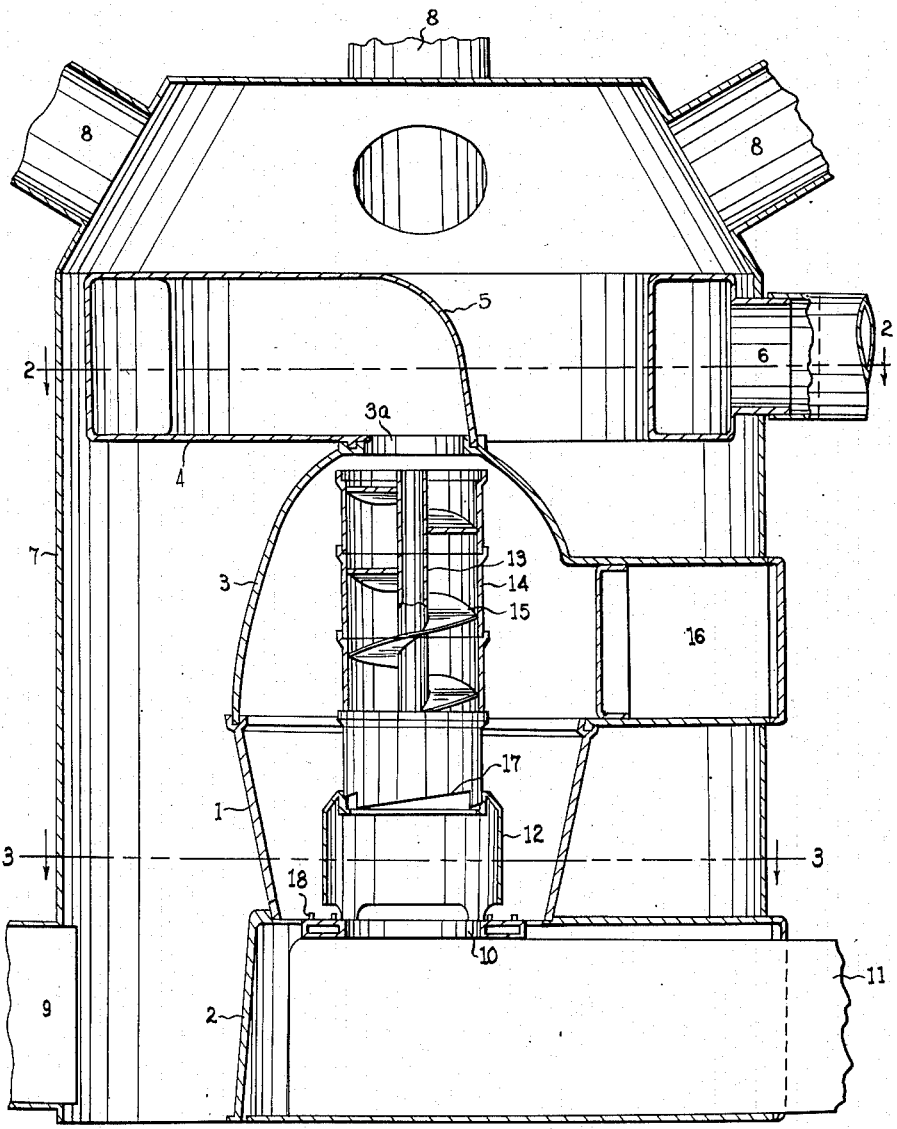
Fig. 1 is a view in axial sectional elevation of an air-heating type of furnace equipped with the herein disclosed heat conserver.
Figure 2:
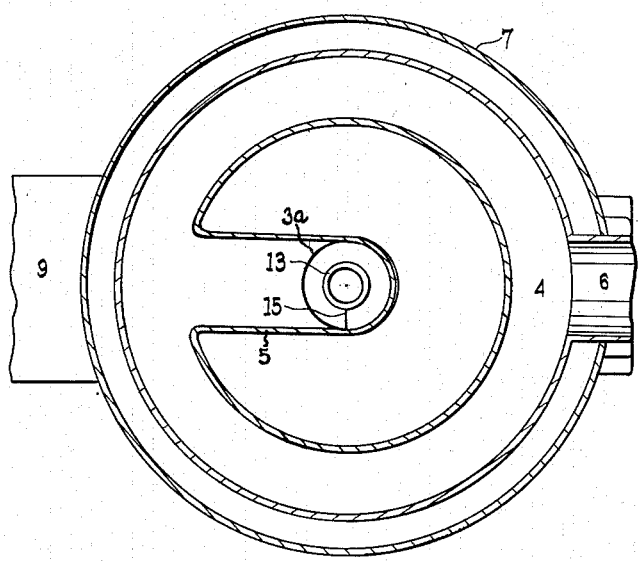
Fig. 2 is a cross sectional view of the top portion of the furnace, taken on the line 2—2 of Fig. 1.
Figure 3:
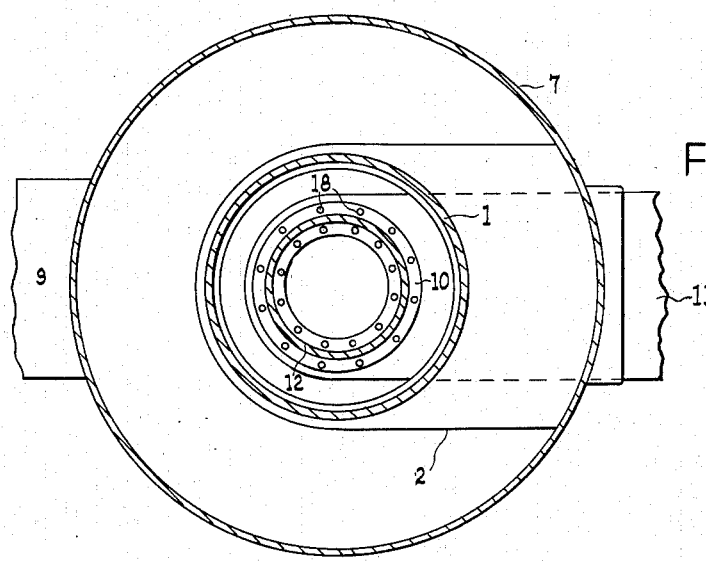
Fig. 3 is a further cross section taken on the line 3—3 of Fig. 1, and particularly showing the burner and heat conserver base.
Figure 4:
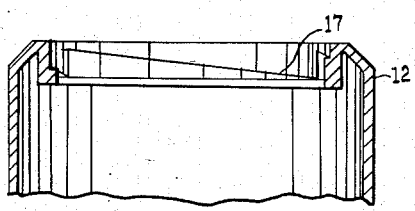
Fig. 4 is an axial sectional view of the base of the heat conserver, particularly showing a cam-forming seat for the superstructure.

In these views, the reference character 1 designates the fire-pot, 2 the ash pit, and 3 the dome of a hot air furnace, the combustion chamber of which is jointly formed by the fire-pot and dome. Formed centrally in the dome at its top is an outlet 3a through which combustion gases discharge to a so-called radiator 4. The latter is commonly of the annular form, illustrated, and has an inlet fitting 5 seating on the dome marginally of said outlet, and a peripheral gas outlet 6, for connection to a flue (not shown).

Surrounding and spaced from the combustion chamber and radiator is a sheet metal casing 7, the top of which is spaced above the radiator, forming a distribution chamber from which a suitable number of hot air pipes 8 extend. Cold air is delivered to the lower portion of said casing through a duct (or ducts) 9.

Originally the fire pot of the described furnace is equipped with a grate at its juncture with the ash pit to receive solid fuel. The present invention replaces such grate by a fluid fuel burner 10, preferably of the annular form illustrated. Said burner may be supported in any desired manner, and as shown, is carried by a duct 11 arranged in the ash pit and delivering combustion-supporting air to the burner.

Centrally rising within the combustion chamber is a heat conserver comprising an annular base 12, inner and outer spaced coaxial pipes 13 and 14 and a spiral baffle member 15 integrally connecting such pipes. To facilitate its manufacture and to further permit of its introduction into the combustion chamber through the usual fuel feed passage 16, the conserver is formed in several superposed sections, one thereof being formed by the base, and the others each comprising vertically coextensive portions of the pipes 13 and 14 and baffle 15. The sections surmounting the base may be termed the superstructure, and are suitably interfitted to maintain their aligned relation, as by enlarging the upper ends of the sections of the pipe 14 to seat and embrace the lower ends of the overlying sections.

For reasons which will presently appear, it is preferred to adapt the heat conserver to undergo some variation in height. This is accomplished in the illustrated construction by forming the base and bottom section of the pipe 14 with engaging edges 17 of a gradual spiral form, so that a relative rotary displacement of such edges may proportionately elevate the superstructure.

The burner is formed with inner and outer circular sets of nipples 18 for discharging fluid fuel (or a mixture of such fuel and air) and the heat conserver seats between the inner and outer nipples. Thus provision is made for combustion both within and around the heat conserver.

In operation of the described furnace, the combustion gases rising within the heat conserver flow to some extent through the pipe 13 but primarily between the two coaxial pipes. Thus the primary flow through the conserver is baffled and retarded by the spiral member 15, while there is presented a large contact area to the hot gases, assuring a high absorption of heat by the conserver. This absorption is still further increased by the rise of combustion gases around the conserver, particularly since such rise is retarded by restricting the passage formed between the conserver top and the dome. The variable height of the conserver, derived from the engaging cam faces 17, permits of an accurate regulation of said passage. Controlling combustion, as described, serves to maintain substantially the entire conserver at a red heat, with the result that complete and efficient combustion of the fuel mixture is assured, and a high outward radiation of heat from the conserver is maintained. Such radiation, together with the combustion occurring exteriorly of the conserver imposes a high temperature on the fire pot and dome, adapting them to very effectively heat the air rising around the combustion chamber. Such air is further heated by the radiator 4, prior to discharge through the distributing pipes 8.

It has been found, in actual practice, that the heating effect derived by a given consumption of fluid fuel may be increased over present practice by at least fifteen per cent through use of the described conserver, and that substantially perfect combustion is at the same time achieved.

While the conserver, as illustrated, is installed in a furnace originally designed for solid fuel, it is to be understood that the construction may be considerably varied, particularly in the case of a combustion chamber especially designed to receive the heat conserver.

The invention is presented as including all such modifications and changes as come within the scope of the following claims.

What I claim is:

1. In a furnace, a combustion chamber having an outlet in its top, a hollow cylinder disposed substantially vertically in said chamber and beneath said outlet, and spaced from the top of said chamber, to afford a passage to said outlet from the space surrounding the cylinder, means for upwardly discharging fluid fuel interiorly and exteriorly of the cylinder, means within the cylinder for retarding the rise of combustion gases, a radiator chamber surmounting the combustion chamber and communicating with said outlet, and means for withdrawing gases from said radiator chamber.

2. A furnace as set forth in claim 1, said cylinder being vertically adjustable to vary its spacing from the top of the combustion chamber.

3. A furnace comprising a combustion chamber having an outlet at its top, a fluid fuel burner arranged in the lower portion of such chamber, a hollow cylinder upstanding in such chamber, substantially from the burner and subdividing the fuel discharged from the burner, means within the cylinder and substantially coextensive therewith for baffling rising combustion gases, the upper end of the cylinder being disposed beneath said outlet and spaced from the top of said chamber to afford a passage to said outlet for combustion gases generated exteriorly of the cylinder, and means for withdrawing gases from said outlet.

4. A furnace comprising a combustion chamber having an outlet at its top, a hollow cylinder disposed substantially vertically in said chamber and downwardly spaced from the top of said chamber, a burner at the lower end of the cylinder arranged to discharge fuel upwardly into and around the cylinder, means within the cylinder for retarding the rise of combustion gases therein, and means for withdrawing combustion gases from said outlet, the cylinder comprising a plurality of sections superposed one on another, two of such sections having engaging inclined cam faces extending circumferentially of the cylinder, whereby relative rotation of said sections varies the height of the cylinder and so regulates the spaced relation of the cylinder to the top of the combustion chamber.

5. A furnace comprising a combustion chamber having an outlet for combustion gases at its top, a hollow cylinder disposed substantially vertically in said chamber and beneath said outlet, and downwardly spaced from the top of said chamber, a burner at the lower end of the cylinder arranged to discharge fuel upwardly into and around the cylinder, means within the cylinder for retarding the rise of combustion gases therein, and means for withdrawing combustion gases from said outlet, the cylinder comprising a plurality of sections superposed one on another, one of such sections having a seat for a superposed section, said seat varying in height in circumferentially spaced, seat-forming areas thereof, whereby the superimposed section may be raised or lowered to vary the height of the cylinder and so vary its spaced relation to the top of the combustion chamber.

6. A furnace comprising a combustion chamber having an outlet for combustion gases at its top, a hollow cylinder disposed substantially vertically in said chamber and beneath said outlet and downwardly spaced from the top of said chamber, a burner at the lower end of the cylinder arranged to discharge fluid fuel upwardly into and around the cylinder, means within the cylinder for retarding the rise of combustion gases therein, and means for withdrawing combustion gases from said outlet, the cylinder being adjustable to vary its spaced relation to the combustion chamber top, to regulate the flow of gases from the space surrounding the cylinder to said outlet.

7. In a furnace a heat conserver comprising a plurality of heat-conserving sections superposed one on another, and each having an inner and an outer cylinder and a spiral baffle member rigidly connecting said cylinders, the outer cylinders of said sections having an interfitting relation and the inner cylinders of said sections being intercommunicating, and the baffle members of said sections being arranged to form a continuous spiral flight.

EDWIN FRANKLAND.